United States Patent
Smith et al.

(10) Patent No.: US 11,667,067 B2
(45) Date of Patent: Jun. 6, 2023

(54) FLOW REGULATOR FOR EXTRUDER ASSEMBLY

(71) Applicant: Baker Perkins Inc., Grand Rapids, MI (US)

(72) Inventors: Jason Alan Smith, Portage, MI (US); James E. Jett, II, Lamont, MI (US); David E. Rhodea, Allendale, MI (US)

(73) Assignee: Baker Perkins Inc., Grand Rapids, MI (US)

( * ) Notice: Subject to any disclaimer, the term of this patent is extended or adjusted under 35 U.S.C. 154(b) by 768 days.

(21) Appl. No.: 16/660,190

(22) Filed: Oct. 22, 2019

(65) Prior Publication Data

US 2020/0147851 A1   May 14, 2020

Related U.S. Application Data

(60) Provisional application No. 62/758,092, filed on Nov. 9, 2018.

(51) Int. Cl.

| | |
|---|---|
| *B29C 48/255* | (2019.01) |
| *B29C 48/345* | (2019.01) |
| *B29C 48/35* | (2019.01) |
| *A21C 3/04* | (2006.01) |
| *A23P 30/20* | (2016.01) |
| *B29C 48/465* | (2019.01) |
| *B29C 48/00* | (2019.01) |

(52) U.S. Cl.
CPC ............ *B29C 48/2556* (2019.02); *A21C 3/04* (2013.01); *A23P 30/20* (2016.08); *B29C 48/0022* (2019.02); *B29C 48/345* (2019.02); *B29C 48/35* (2019.02); *B29C 48/465* (2019.02); *B29C 2793/009* (2013.01)

(58) Field of Classification Search
CPC ............ A21C 3/04; A21C 3/10; A21C 11/10; A21C 11/16; A23P 30/20; B29C 48/0022; B29C 48/2556; B29C 48/345; B29C 48/465; B29C 48/92; B29C 2948/926
See application file for complete search history.

(56) References Cited

U.S. PATENT DOCUMENTS

| | | | |
|---|---|---|---|
| 1,696,891 A | 12/1928 | Crosland | |
| 2,811,117 A | 10/1957 | Monaco | |
| 3,019,746 A | 2/1962 | Cunningham et al. | |
| 4,395,427 A * | 7/1983 | Fischer ................ | A21C 11/16 425/383 |
| 4,398,881 A | 8/1983 | Kobayashi | |
| 4,913,645 A | 4/1990 | Daouse et al. | |
| 4,925,380 A | 5/1990 | Meisner | |
| 5,019,404 A | 5/1991 | Meisner | |
| 5,770,129 A | 6/1998 | Monti | |
| 7,771,182 B2 | 8/2010 | Fornaguera | |
| 8,192,664 B2 | 6/2012 | Polk, Jr. et al. | |
| 9,216,535 B2 | 12/2015 | Trice et al. | |

\* cited by examiner

*Primary Examiner* — Xiao S Zhao
*Assistant Examiner* — Joseph S Leyson
(74) *Attorney, Agent, or Firm* — Price Heneveld LLP

(57) ABSTRACT

An extruder assembly includes a rolling assembly. An extrusion block includes a plurality of extruding ports that receive an extrudable material from the rolling assembly. A regulating mechanism is positioned within, above, or otherwise near each extruding port of the plurality of extruding ports. The regulating mechanism is operable with respect to the rolling assembly to modify a flow of extrudable material through each respective extruding port.

19 Claims, 11 Drawing Sheets

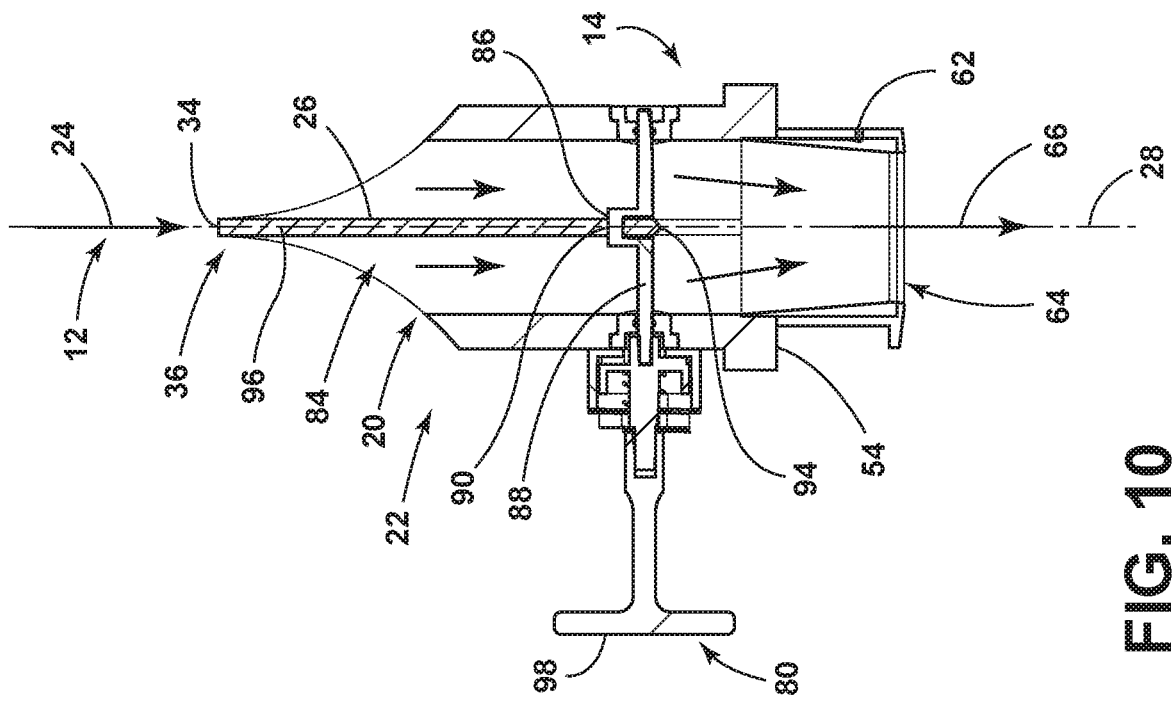
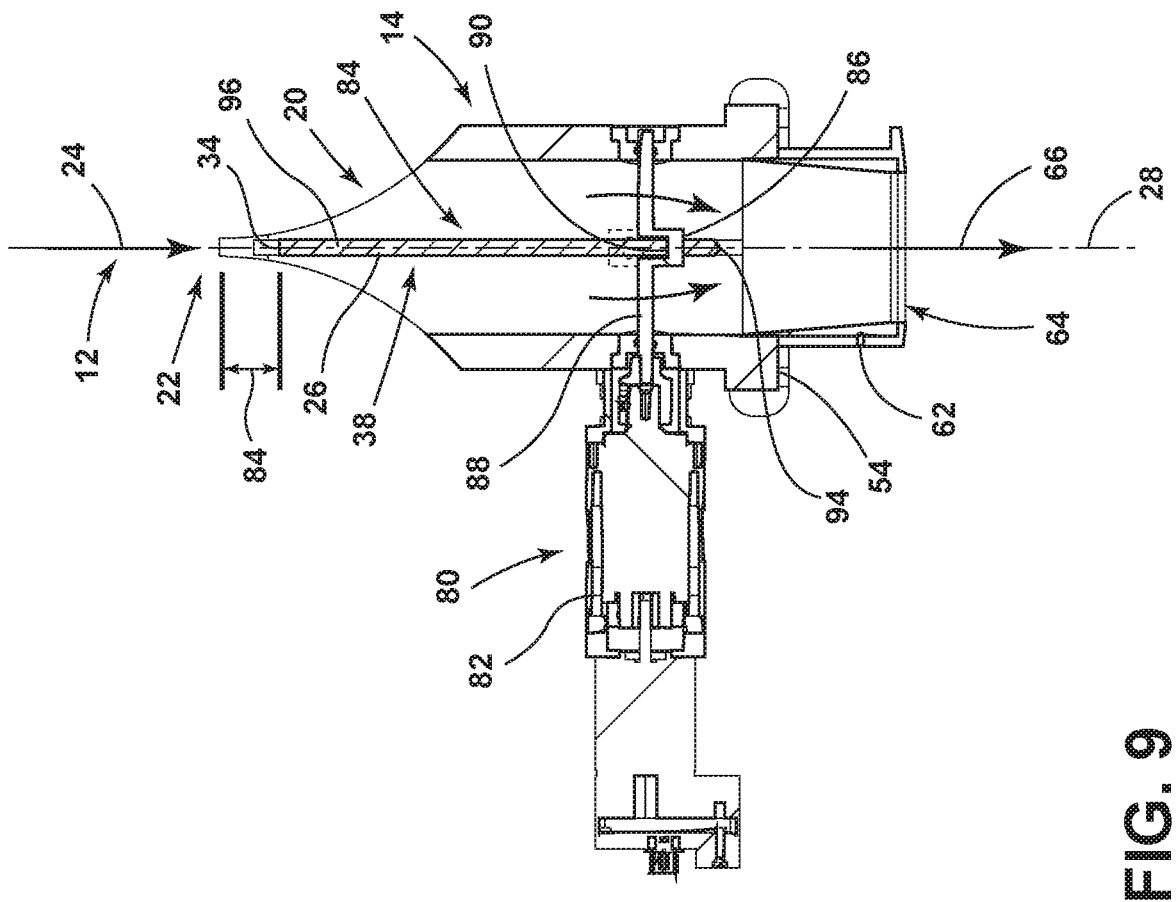
FIG. 9
FIG. 10

FLOW REGULATOR FOR EXTRUDER ASSEMBLY

CROSS-REFERENCE TO RELATED APPLICATION

This application claims priority to and the benefit under 35 U.S.C. § 119(e) of U.S. Provisional Patent Application No. 62/758,092, filed on Nov. 9, 2018, entitled FLOW REGULATOR FOR EXTRUDER ASSEMBLY, the entire disclosure of which is hereby incorporated herein by reference.

FIELD OF THE INVENTION

The invention generally relates to extruder assemblies, and more specifically, an extruder assembly having a flow regulator that is able to modify the volume of the material flowing into the extruder.

BACKGROUND OF THE INVENTION

During manufacture of edible materials that are formed through an extrusion process, where a cutting assembly cuts an extruded material using a repeated cutting operation. This extrusion and cutting process is used to achieve consistency in product weights, dietary information, serving sizes and other concerns related to the manufacture and retail of products as well as those of the end consumers.

SUMMARY OF THE INVENTION

According to one aspect of the present invention, an extruder assembly includes a rolling assembly. An extrusion block includes a plurality of extruding ports that receive an extrudable material from the rolling assembly. A regulating mechanism is positioned within, above or otherwise near each extruding port of the plurality of extruding ports. The regulating mechanism is operable with respect to the rolling assembly to modify a flow of extrudable material through each respective extruding port.

According to another aspect of the present invention, a regulating extruder assembly includes a rolling assembly. An extruding block has a plurality of extruding ports that receive an extrudable material from the rolling assembly. A plurality of flow regulators are positioned along respective central axes of the plurality of extruding ports, respectively. Each flow regulator is selectively operable along the central axis of a respective extruding port and relative to the rolling assembly to modify a flow of the extrudable material through the respective extruding port.

According to another aspect of the present invention, a regulating extruder assembly includes a rolling assembly. An extruding block includes a plurality of extruding ports that receive an extrudable material from the rolling assembly. A plurality of flow regulators are positioned within the plurality of extruding ports, respectively. Each flow regulator is selectively operable along a central axis of a respective extruding port and relative to a nip point of the rolling assembly to modify at least one of a speed and density of the extrudable material exiting the respective extruding port.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 9 is a cross-sectional view of the extrusion block of FIG. 7 taken along line IX-IX and showing the flow regulator in a lowered more-volume position;

FIG. 10 is a cross-sectional view of the extrusion block of FIG. 7 taken along line X-X and showing the flow regulator in a raised less-volume position with respect to the rolling assembly;

DETAILED DESCRIPTION OF THE PREFERRED EMBODIMENTS

Figure 1:
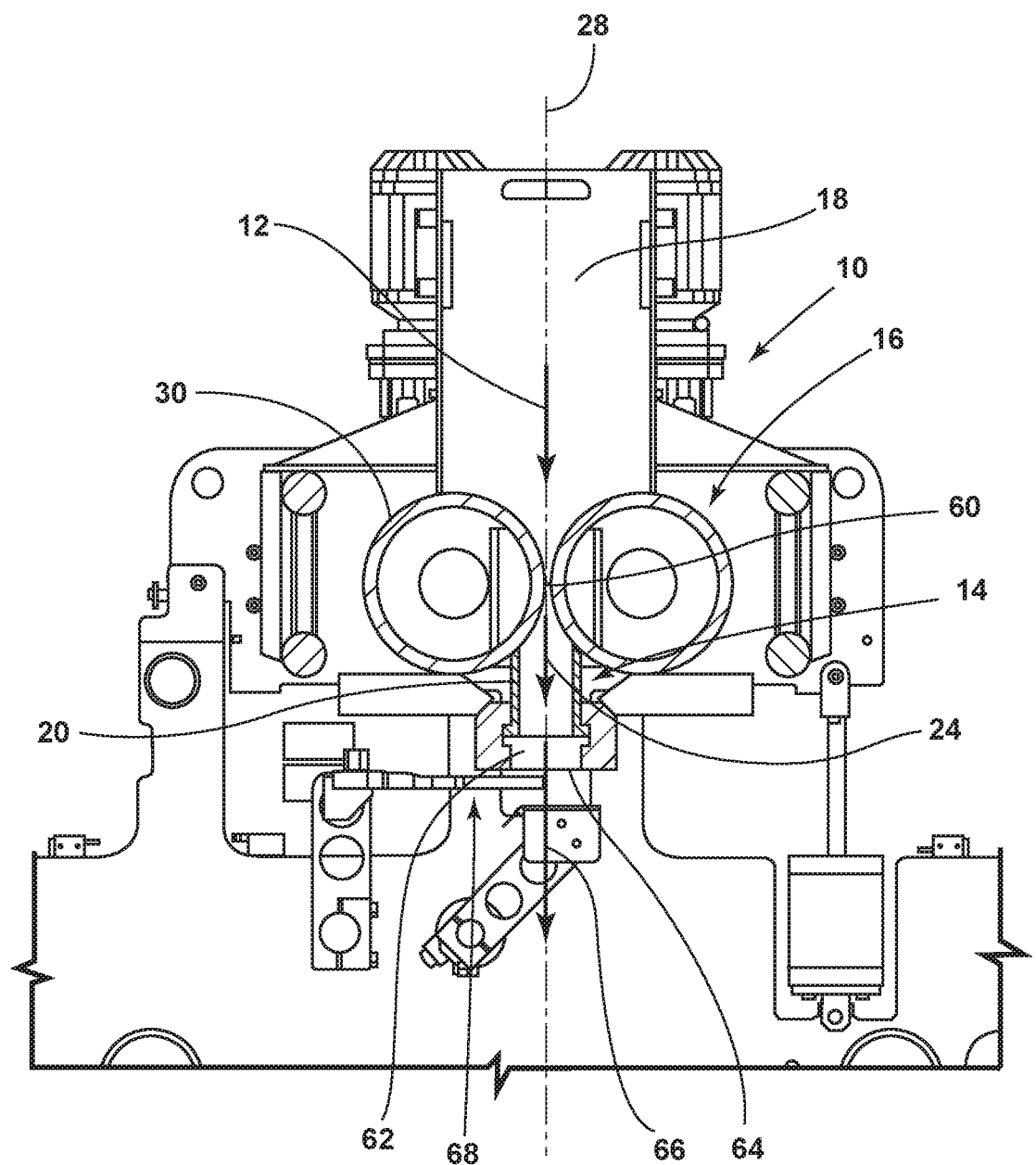
FIG. 1 is a cross-sectional view of an extruder assembly for extruding an edible product through a cutting assembly.
Figure 2:
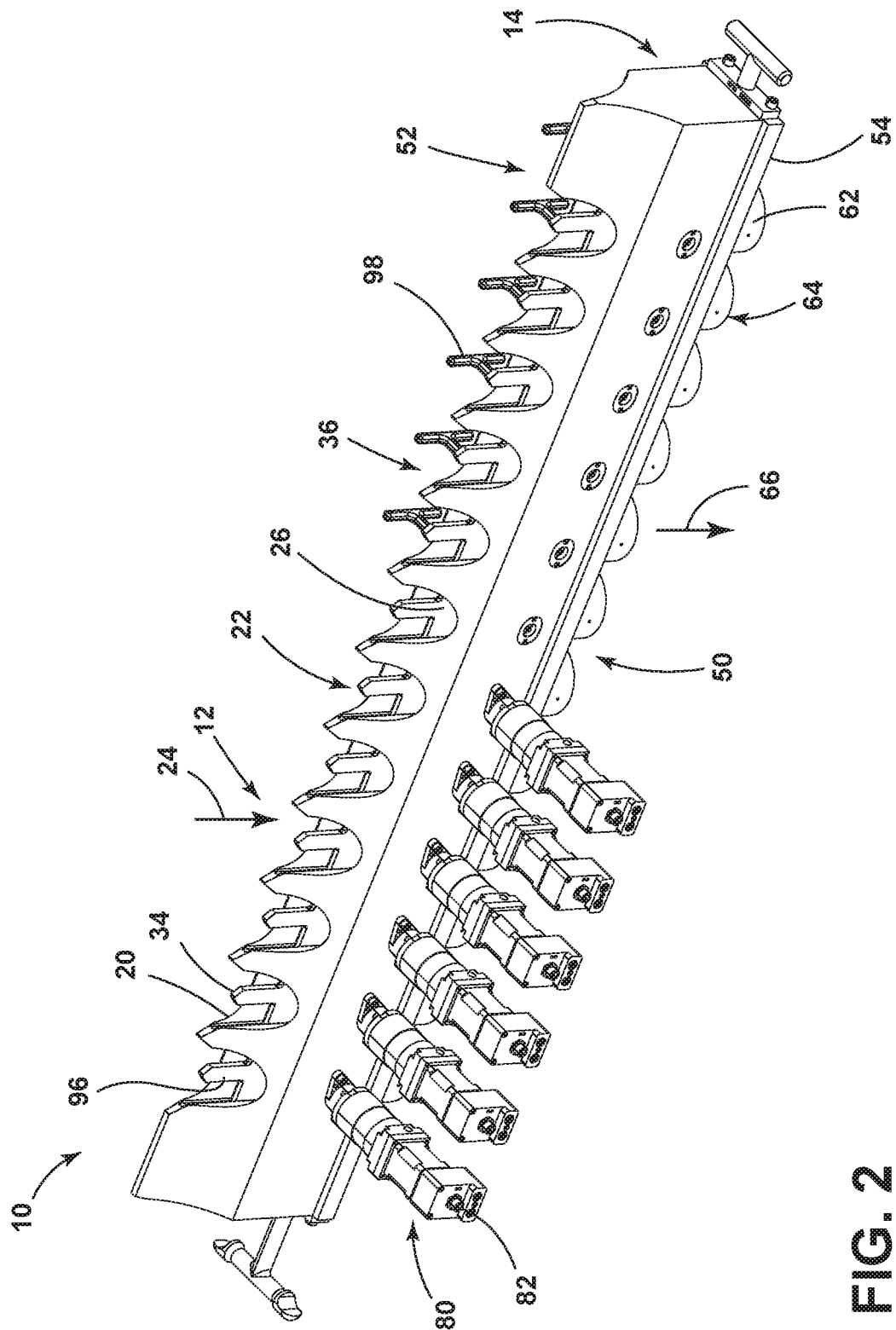
FIG. 2 is a top perspective view of an extrusion block that incorporates an aspect of the regulating mechanism within the individual extruding ports and showing motor-operated and manually-operated aspects of the regulating mechanism.
Figure 3:
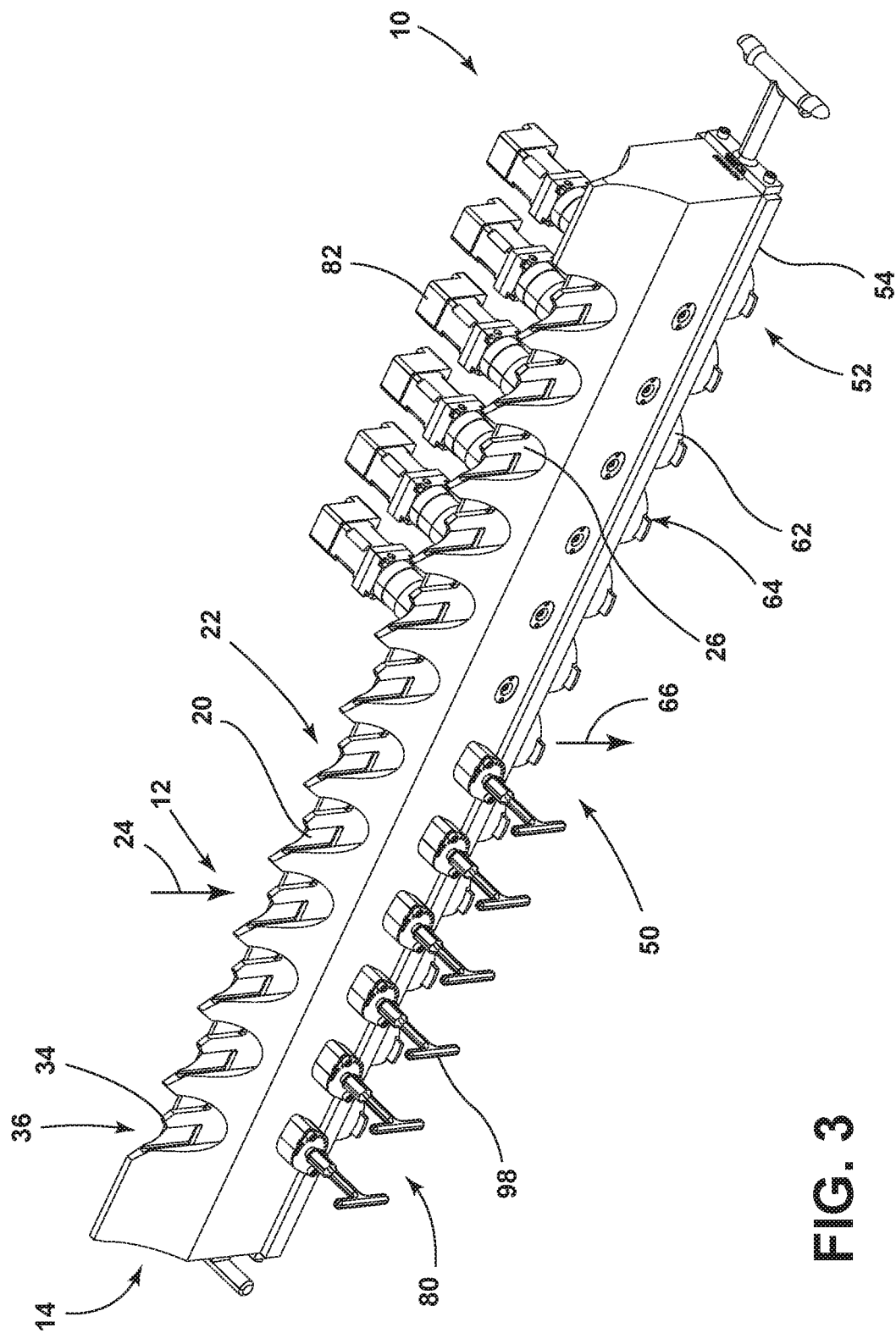
FIG. 3 is another top perspective view of the extrusion block of FIG. 2.
Figure 4:
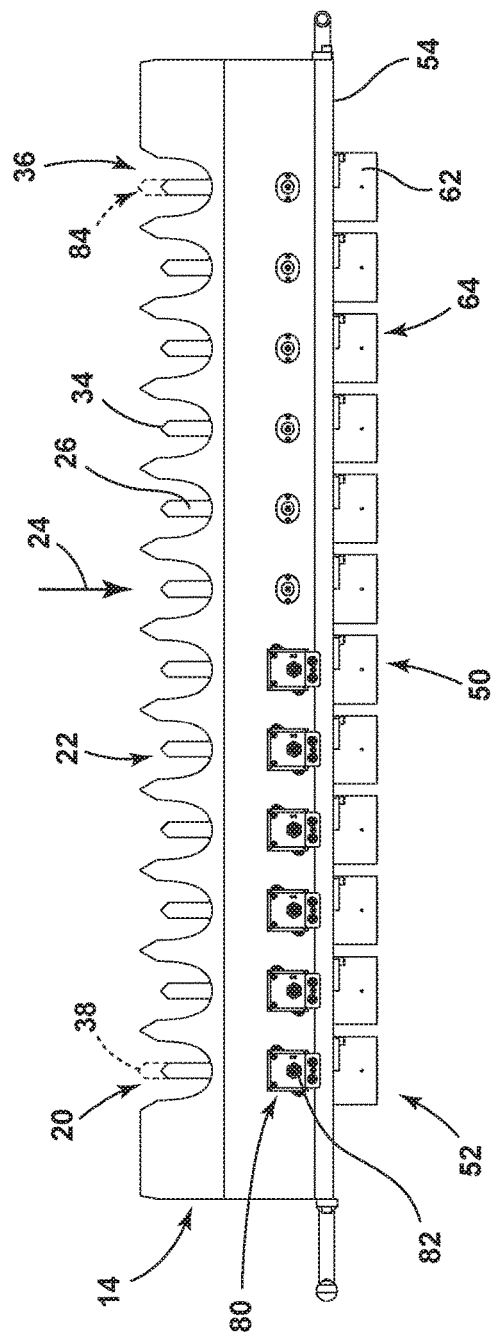
FIG. 4 is a side elevational view of the extrusion block of FIG. 2.
Figure 5:
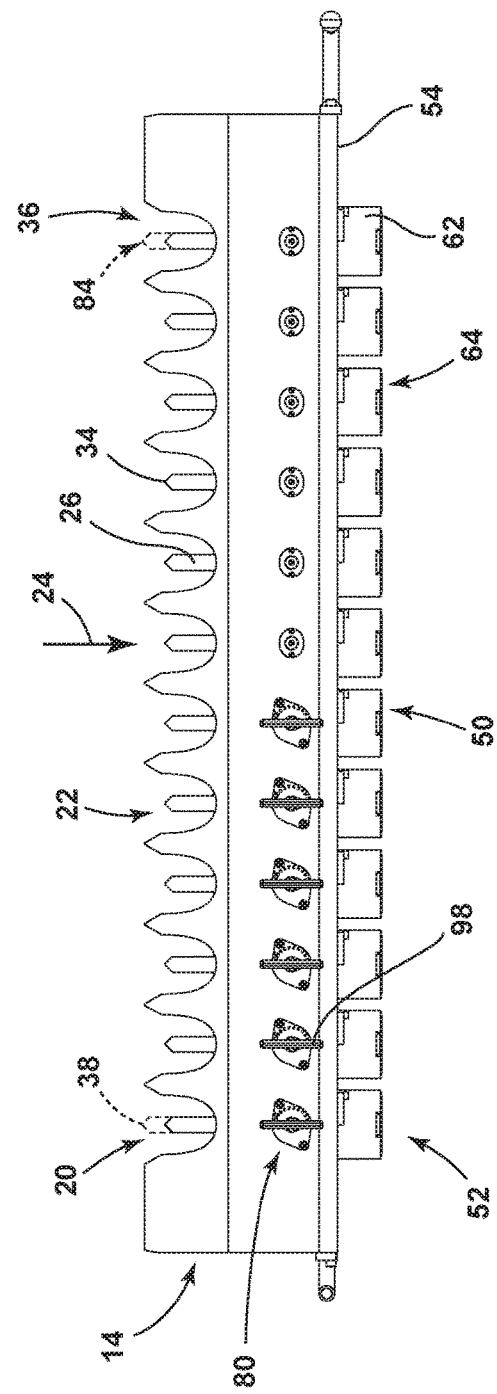
FIG. 5 is another side elevational view of the extrusion block of FIG. 2.
Figure 6:
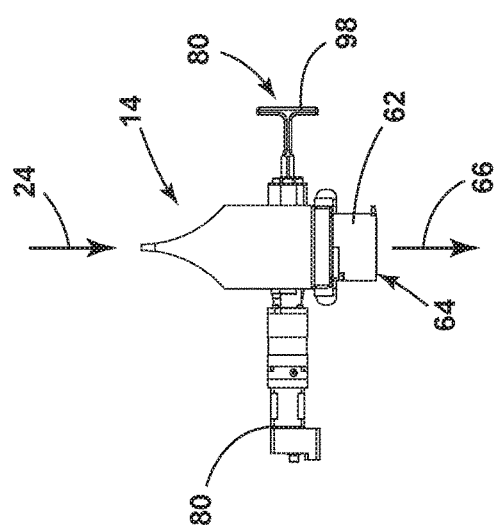
FIG. 6 is another side elevational view of the extrusion block of FIG. 2.
Figure 7:
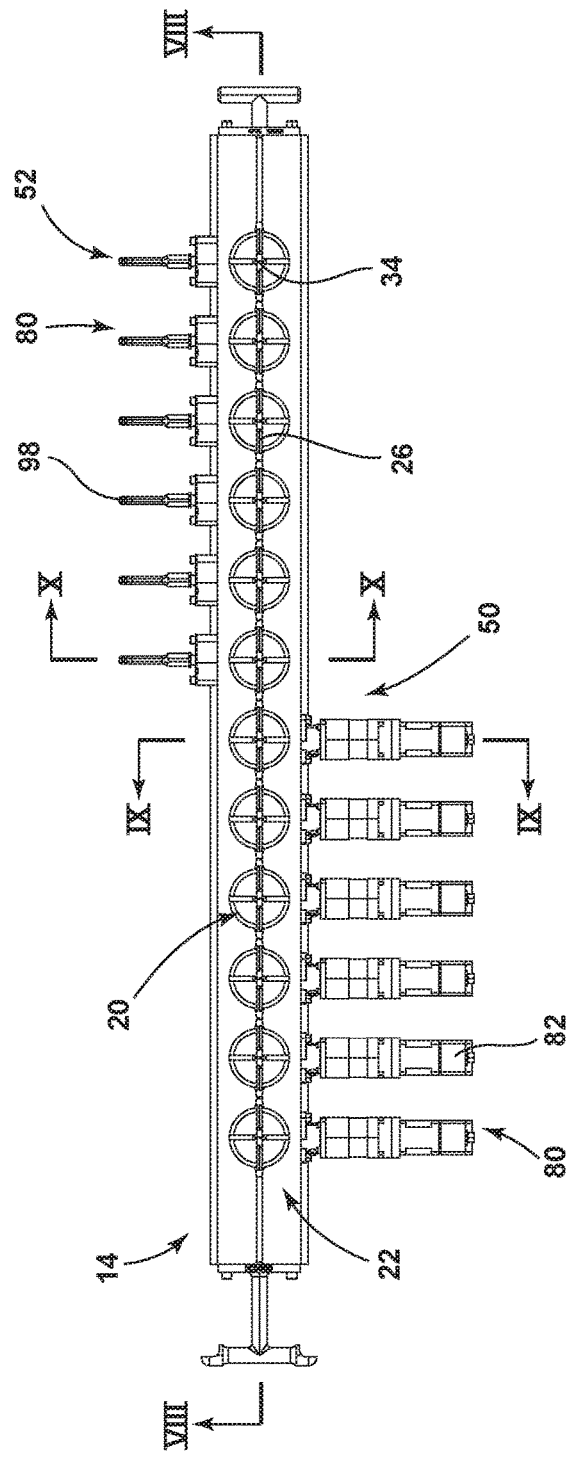
FIG. 7 is a top plan view of the extrusion block of FIG. 2.
Figure 8:
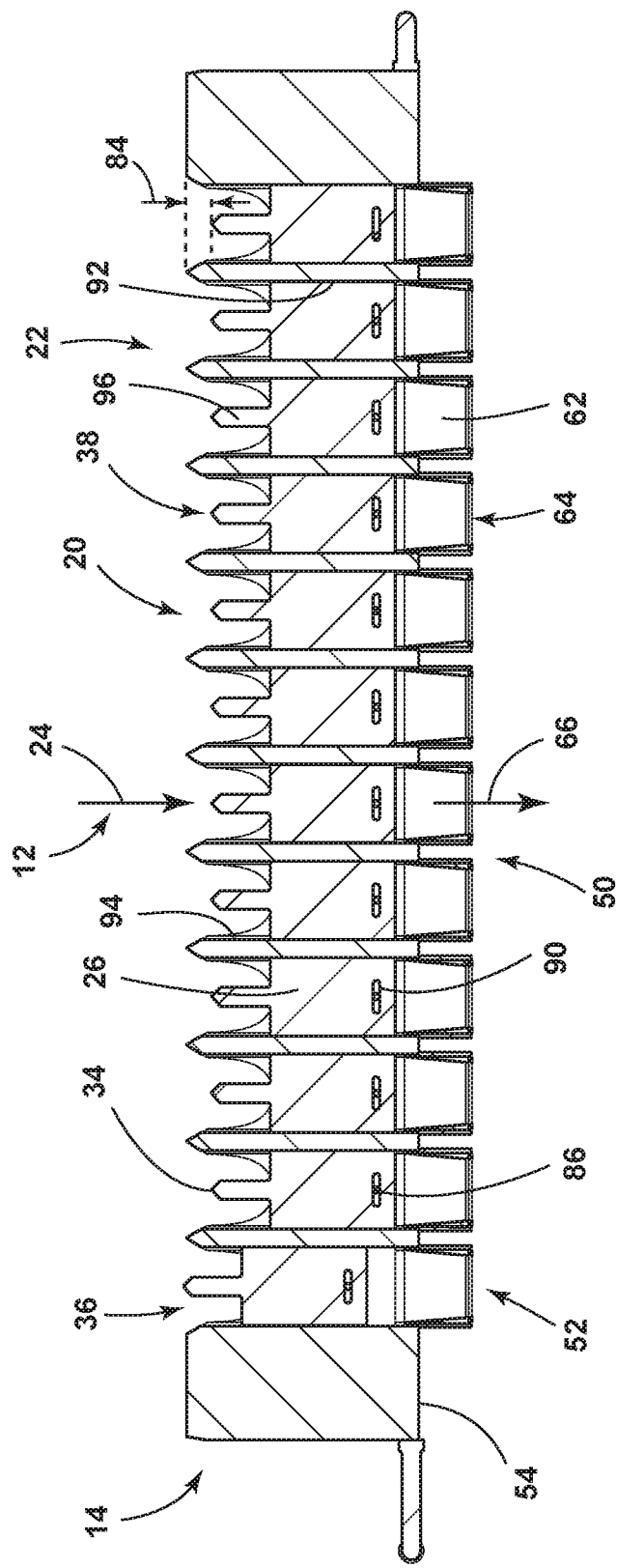
FIG. 8 is a cross-sectional view of the extrusion block of FIG. 7 taken along line VIII-VIII and showing various positions of the individual flow regulators of the regulating mechanism.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-13, reference numeral 10 generally refers to an extruder assembly that can be used for extruding an extrudable material 12 through an extrusion block 14 for subsequent cutting into individual sections. The cut extrudable material 12 can be edible dough that can be baked into edible goods such as cookies, dog treats, wafers, and other edible products. The extrudable material 12 can also be in the form of non-edible dough, such as Play-Doh® and other similar modeling clays. According to various aspects of the device, the extruder assembly 10 can include a rolling assembly 16 that can move the extrudable material 12 from a holding container 18 and into the extrusion block 14. The extrusion block 14 includes a plurality of extruding ports 20 that receive the extrudable material 12 from the rolling assembly 16. A regulating mechanism 22 includes a plurality of flow regulators 26 that are positioned within each extruding port 20 of the plurality of extruding ports 20. As illustrated in the figures, a flow regulator 26 is typically positioned within each extruding port 20. It should be understood that the regulating mechanism 22 can be located in alternate locations as well. Such locations can include, but are not limited to, above, below or otherwise near to the plurality of extruding ports 20. Typically, each of the flow regulators 26 are aligned with a central axis 28 of the respective extruding ports 20. Each flow regulator 26 of the regulating mechanism 22 is operable with respect to the rolling assembly 16 to modify a flow 24 of the extrudable material 12 through each respective extruding port 20. Through the use of the regulating mechanism 22, operation of the rolling assembly 16 can be substantially consistent and the amount of extrudable material 12 that is delivered from the rolling assembly 16 and into and through each extruding port 20 is governed through operation of the regulating mechanism 22 within, above or otherwise near each extruding port 20.

During operation of the extruder assembly 10, the extrudable material 12 is rolled between the opposing rollers 30 of the rolling assembly 16. As the extrudable material 12 enters each of the extruding ports 20, the extrudable material 12 moves through each extruding port 20. While traveling through the extruding port 20, the extrudable material 12 tends to become conformed to the shape of the extruding port 20 and tends to form into a material having a substantially consistent density. Accordingly, when the extrudable material 12 leaves the extruding port 20, the extrudable material 12 is in a substantially consistent and homogenous flow 24 of the extrudable material 12 having the substantially consistent density. Using this property of the flow 24 of extrudable material 12, the regulating mechanism 22 moves in a generally axial or linear direction 32 within, above or near to the extruding port 20 and along the central axis 28 of each respective extruding port 20. Through this linear operation, an obstructing end 34 of each flow regulator 26 of the regulating mechanism 22 can be operated along a central axis of the respective extending port 20 to regulate a volume of the extrudable material 12 that travels from the opposing rollers 30 and into the extruding ports 20. By varying the volume of the extrudable material 12 entering into the extruding ports 20, the regulating mechanism 22 can, in turn, modify the extruded flow 66 leaving the extruding ports 20. This modification of the extruded flow 66 can take the form of a change in the speed of the extruded flow 66 through the extruding port 20 or a change in the density of the extruded flow 66 exiting the extruding port 20, or both. Whether the modification to the extruded flow 66 is in the form of a speed adjustment or a density adjustment, or both, can depend on the characteristics of the extrudable material 12.

According to various aspects of the device, operation of the regulating mechanism 22 changes the volume of the extrudable material 12 that leaves the interface 60 (sometimes referred to as a nip point) of the opposing rollers 30. A decrease in the volume of the extrudable material 12 results in less of the extrudable material 12 moving into and through the extruding port 20. In turn, because there is less material, the speed of the extruded flow 66 of the extrudable material 12 may become slower. As the extruded flow 66 leaves the lower end 64 of the respective cup 62, the decrease in speed results in the cutting assembly 68 operating at a consistent cutting rate, making thinner cuts through the slower extruded flow 66. Conversely, where the regulating mechanism 22 operates to increase the volume of the extrudable material 12, the extruded flow 66 can increase in speed. This increase in speed of the extruded flow 66 results in thicker cuts by the cutting assembly 68 operating at the consistent cutting rate. This adjustment of the speed of the extruded flow 66, by modifying the incoming volume of the extrudable material 12, can operate to adjust the weight of the cut sections of the extruded flow 66 of the extrudable material 12.

To achieve the changes in the volume of the extrudable material 12 leaving the opposing rollers 30 and entering into the extruding ports 20, the regulating mechanism 22 is operable between a plurality of axial positions 84 that include a less-volume position 36, wherein the obstructing end 34 of the regulating mechanism 22 is proximate the rolling assembly 16, and a more-volume position 38, wherein the obstructing end 34 of the regulating mechanism 22 is distal from the rolling assembly 16. Each of the less-volume and more-volume positions 36, 38 will be described more fully below.

According to various aspects of the device, as exemplified in FIGS. 2-13, each extruding port 20 will include a dedicated flow regulator 26 of the regulating mechanism 22 that is selectively and independently operable within the respective extruding port 20 for modifying the volume of the extrudable material 12 that flows into that respective extruding port 20. During operation of the extruder assembly 10, various extruding ports 20 may have a tendency to receive more or less amounts of the extrudable material 12 during operation of the rolling assembly 16. Accordingly, using the regulating mechanisms 22 of the various extruding ports 20, the flow regulators 26 can be individually adjusted within each extruding port 20 to account for this difference in the amount or volume of extrudable material 12 that may enter into the respective extruding ports 20. As discussed above, it is contemplated that the regulating mechanism 22 can be positioned within, above or otherwise near to the respective extruding ports 20. Typically, the various flow regulators 26 are positioned along the respective central axes 26 of the extruding ports 20.

By way of example, and not limitation, the extruding ports 20 toward a central area 50 of the extrusion block 14 may tend to receive more amounts of the extrudable material 12. Conversely, the extruding ports 20 toward the outer edges 52 of the extrusion block 14 may tend to receive lesser amounts of the extrudable material 12. To account for this difference in the amount of extrudable material 12 entering the various extruding ports 20, the flow regulators 26 toward the central area 50 may be moved closer to the rolling assembly 16 to decrease the volume of the extrudable material 12 moving into these extruding ports 20 in the central area 50 of the extrusion block 14. The flow regulators 26 located towards the outer edges 52 of the extrusion block 14 may be left in the more-volume position 38 or may be moved in the axial direction 32 to a lesser degree to equalize the volume of the inflow of the extrudable material 12. This equalization in the volume of the extrudable material 12 entering into the various extruding ports 20 also equalizes the output flow 24 of the extrudable material 12 that leaves the lower edges 54 of the extrusion block 14. This equalization is in the form of an equalized weight of the cut segments of the extruded flow 66. By equalizing the output flow 24, the cutting assembly 68 (shown in FIG. 1) can operate at the consistent cutting rate for all of the extruding ports 20 to arrive at a consistent weight of each cut section of the extrudable material 12. This consistent weight can be achieved among all of the extruding ports 20.

Figure 12:
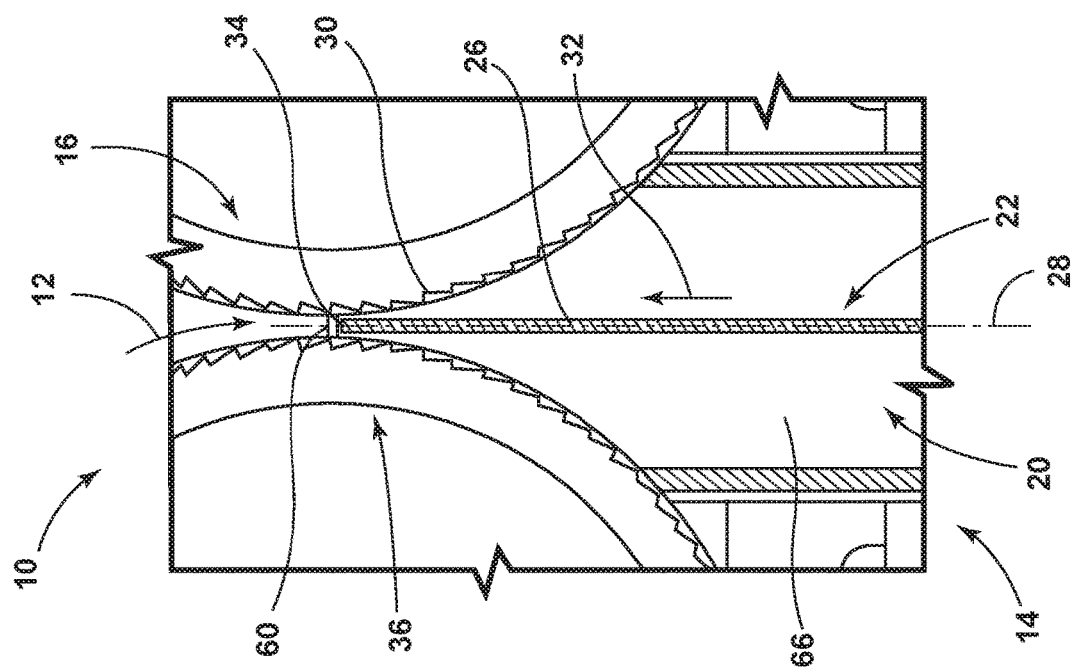
FIG. 12 is a cross-sectional view of the regulating mechanism of FIG. 11 and showing the flow regulator in the more-volume position.
Figure 13:
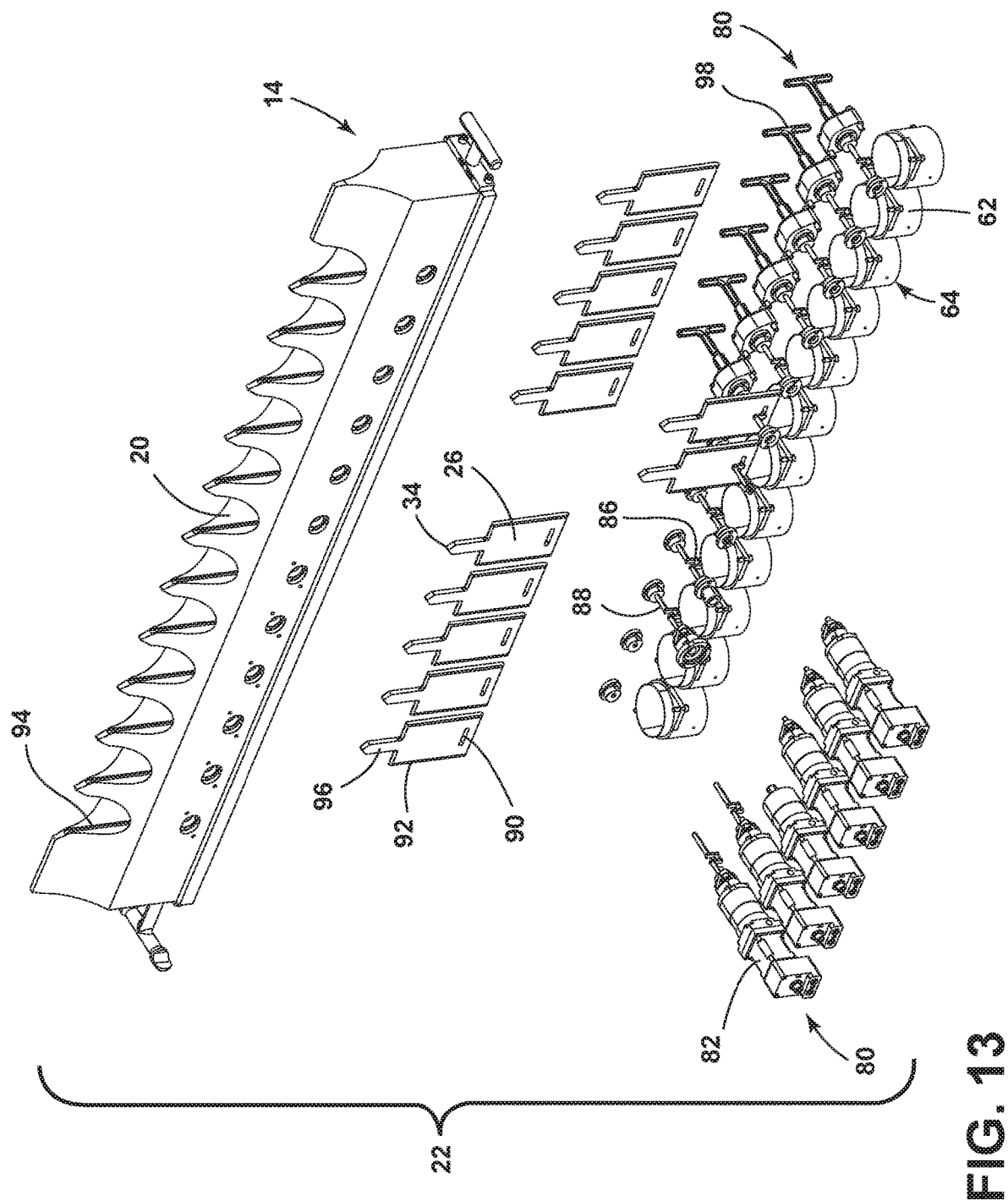
FIG. 13 is an exploded perspective view of the extrusion block of FIG. 2.

As exemplified in FIGS. 9 and 12, where the flow regulator 26 is in the more-volume position 38, as the opposing rollers 30 of the rolling assembly 16 operate, the extrudable material 12 is able to move as a flow 24 and substantially freely around the obstructing end 34 of the flow regulator 26. In this more-volume position 38, the amount of extrudable material 12 that passes into the interface 60 between the opposing rollers 30 may be substantially similar to that which is extruded from the lower end 64 of the cups 62 attached to the lower edge 54 of the extrusion block 14. Accordingly, the speed and/or density of the extruded flow 66 leaving the lower end 64 of the cups 62 may be substantially similar to that of the extrudable material 12 passing between the opposing rollers 30.

Figure 11:
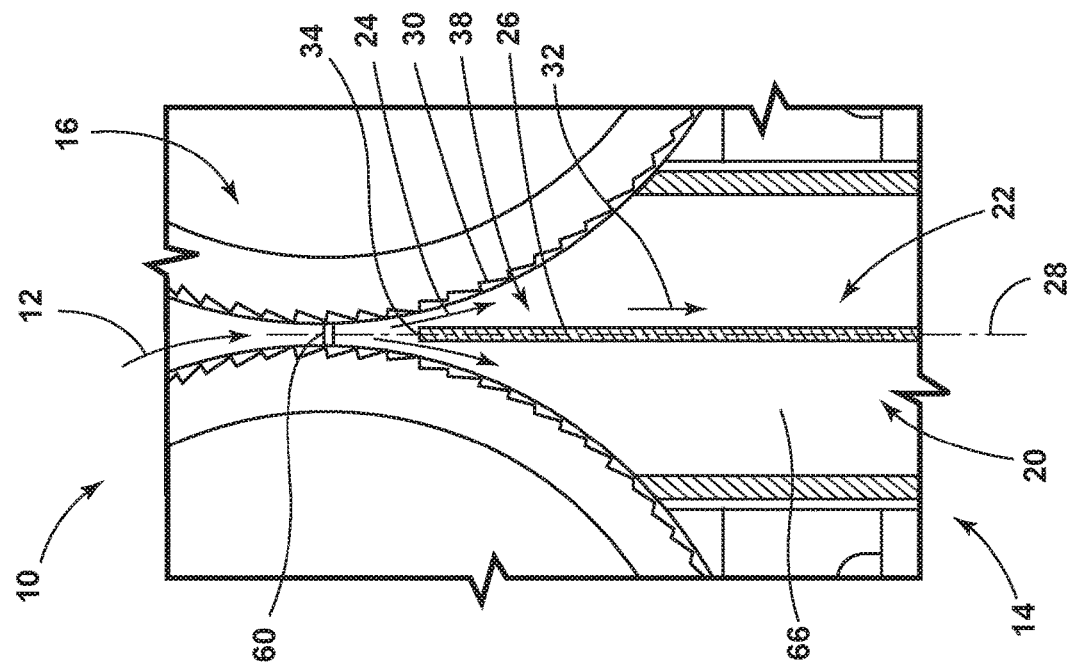
FIG. 11 is a schematic cross-sectional view of a flow regulating mechanism exemplifying the less-volume position.

Referring now to FIGS. 10 and 11, when the flow regulator 26 is moved proximate or at least partially into the interface 60 between the opposing rollers 30, the obstructing end 34 of the flow regulator 26 prevents the flow 24 of extrudable material 12 through at least a portion of the interface 60. Accordingly, the volume of extrudable material 12 that enters into the extruding port 20 is decreased because of this placement of the obstructing end 34 of the flow regulator 26.

Referring again to FIGS. 10 and 11, when the flow regulator 26 is moved to the less-volume position 36, the obstructing end 34 of each flow regulator 26 is positioned in close proximity to the interface 60 between the opposing rollers 30 of the rolling assembly 16. In this less-volume position 36, the obstructing end 34 of the flow regulator 26 prevents a portion of the flow 24 of the extrudable material 12 from entering into the extruding port 20. As a result, the obstructing end 34 of the flow regulator 26 obstructs the extrudable material 12 so that less of the extrudable material 12 moves into the extruding port 20. As the lesser amount of extrudable material 12 moves past the flow regulator 26 and toward the outlet cup 62 at the lower end 64 of the extruding port 20, the density of the extrudable material 12 may, in certain situations, tend to equalize itself within the extruding port 20 to become a consistent flow 24 of material. In such a condition, the obstructing end 34 of the flow regulator 26 can allow less of the extrudable material 12 into the extruding port 20. This natural redistribution of the extrudable material 12 within the extruding port 20 causes the extrudable material 12 to become less dense, compared to the density of the extrudable material 12 than when the regulating mechanism 22 is in the more-volume position 38. This natural redistribution can also result in a slower flow of the extrudable material 12.

In the various aspects of the device, the flow regulators 26 of the regulating mechanism 22 operates to modify the volume of the extrudable material 12 that enters into the extruding ports 20. This adjustment in volume is used to adjust the weight of the cut sections of the extruded flow 66 of material exiting the lower end 64 of the cups 62. The weight can be affected by either a change in the speed of the extruded flow 66, a change in the density of the extruded flow 66, or both. In either case, the change in the extruded flow 66 of the extrudable material 12 is accomplished through operation of the obstructing end 34 of the regulating mechanism 22 in relation to the interface 60 between the opposing rollers 30.

Referring again to FIGS. 2-13, the various aspects of the regulating mechanism 22 are exemplified. In a first aspect of the device, the regulating mechanism 22 can be a manually operated regulating mechanism 22 that has an external adjustment interface 80 with a manual assembly 98 that can be turned by hand or with the use of a hand operated tool for modifying the position of the individual flow regulators 26 of the regulating mechanism 22 between the less-volume position 36 and the more-volume position 38, as well as the plurality of positions 84 therebetween. The second aspect of the device as exemplified in FIGS. 2-13 shows a regulating mechanism 22 that is substantially similar to that of the first aspect of the device. This second aspect can be controlled through operation of one or more motors 82 for operating the individual flow regulators 26 of the regulating mechanism 22 between the less-volume position 36, the more-volume position 38 and the plurality of positions 84 therebetween. In each of the first and second aspects of the device, a rotational adjustment interface 80 is positioned within, above or near a portion of the extruding port 20. This rotational adjustment interface 80 can include a bar 86 that is eccentrically positioned within a rotating shaft 88.

According to the various aspects of the device, a camming mechanism, typically in the form of the rotating bar 86, operates in a generally circular motion within the extruding port 20. This circular motion of the rotating bar 86 engages a guide portion that can take the form of a guide slot 90 defined within the planar member of the flow regulator 26. The rotating bar 86 slidably operates within the slot 90 to adjust the vertical position of the flow regulator 26 between the less-volume position 36 and the more-volume position 38. In the first and second aspects of the device, the flow regulator 26 can include a guide flange 92 that expands laterally within each extruding port 20 and extends diametrically across the extruding port 20. The extruding port 20 may include a guide recess 94 that receives the guide flange 92 for maintaining the position of the guide flange 92 and the remainder of the flow regulator 26 within the extruding port 20. Above the guide flange 92, an elongated member 96 extends upward to the obstructing end 34 of the flow regulator 26. As discussed previously, the obstructing end 34 is the portion of the flow regulator 26 that extends and operates to be proximate and distal in relation to the rolling assembly 16 to define the less-volume position 36 and the more-volume position 38.

Figure 14:
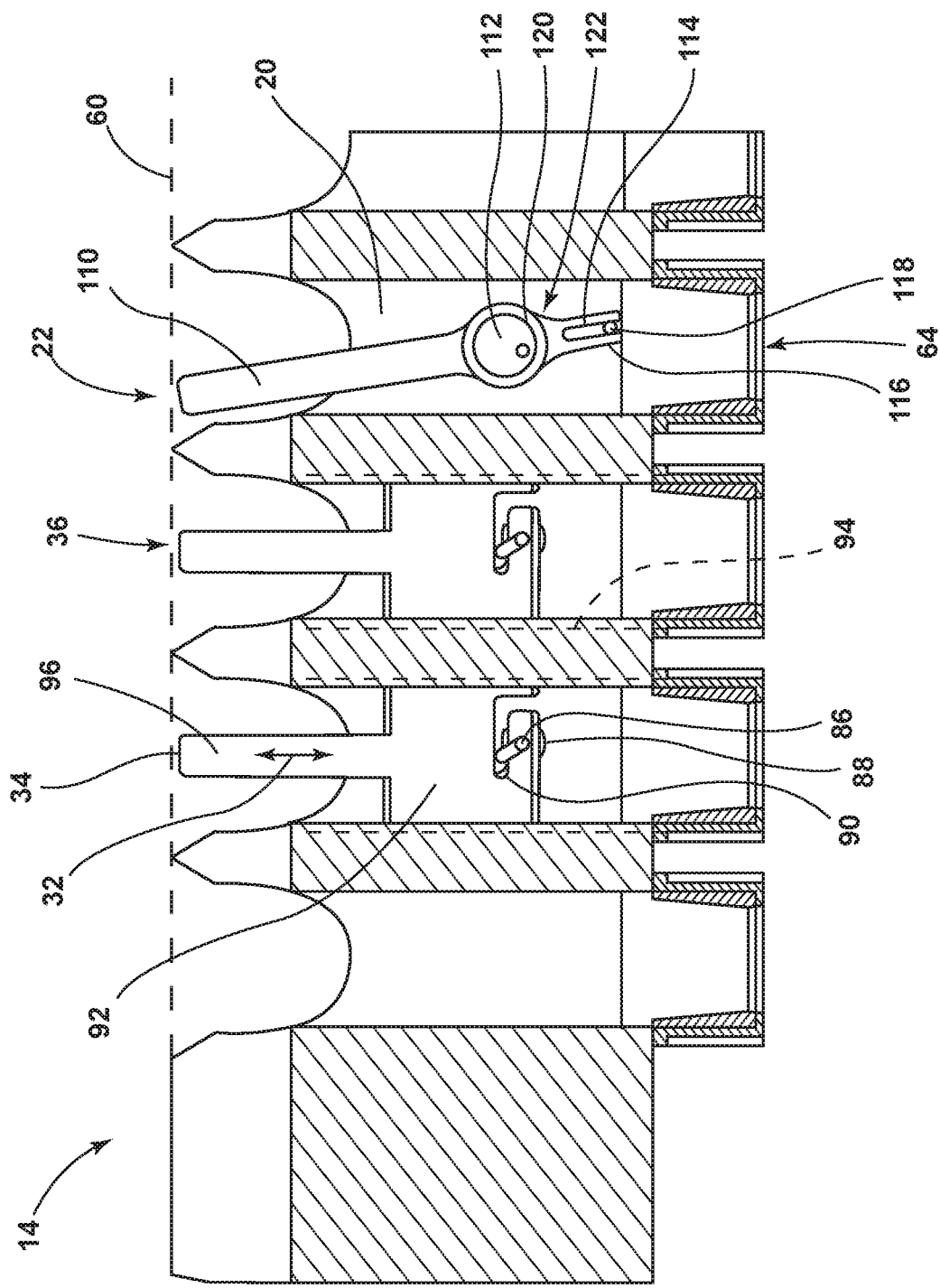
FIG. 14 is a schematic cross-sectional view of an extrusion block showing multiple separate aspects of the regulating mechanism and shown in the less-volume position.
Figure 15:
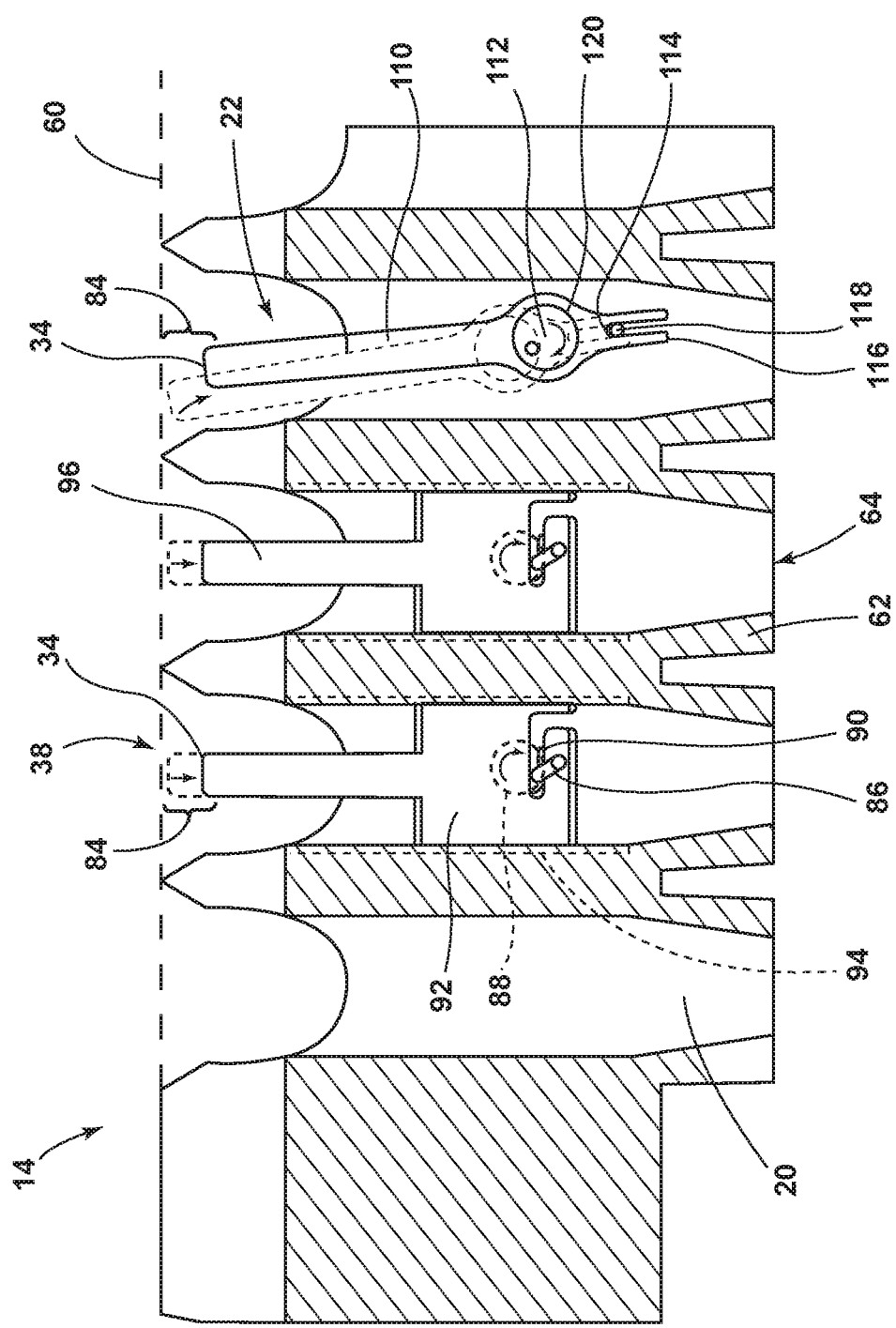
FIG. 15 is a cross-sectional view of the extrusion block of FIG. 14 and showing the various separate aspects of the flow regulators for the regulating mechanism in the more-volume position.

As exemplified in FIGS. 14 and 15, a third aspect of the regulating mechanism 22 can include an elongated regulator 110 having an internal eccentric 112 that is rotationally and slidably operable within the elongated regulator 110. To guide a positon of the elongated regulator 110 and the obstructing end 34 of the regulating mechanism 22, a guide channel 114 can be positioned at a bottom end 116 of the elongated regulator 110 that receives a guide rod 118 that extends within the extruding port 20. In the various aspects of the device, the elongated regulator 110 that makes up the third aspect of the regulating mechanism 22 can include a center aperture 120 that receives the internal eccentric 112. This internal eccentric 112 can be in the form of a camming mechanism 122 that rotates within the extruding port 20 to operate the regulating mechanism 22. The elongated regulator 110 of the regulating mechanism 22 can include the guide channel 114 that slidably engages the guide rod 118 that extends through the respective extruding port 20.

It should be understood that additional mechanisms can be used for vertically operating the regulating mechanism 22 between the less-volume position 36 and the more-volume position 38, as well as the plurality of positions 84 therebetween.

Referring again to FIGS. 1-7, in the motorized aspects of the regulating mechanism 22 exemplified in the second and third aspects illustrated herein, the motor 82 can be in the form of a stepper motor, servo motor, direct drive motor, or other similar motor that can provide finite control of the camming mechanism 122 for vertically operating the obstructing end 34 of the regulating mechanism 22.

For operating the position of the regulating mechanism 22 and the obstructing end 34, each flow regulator 26 for the regulating mechanism 22 can include a dedicated motor 82 for selectively and independently operating the respective rotating shaft 88 and bar 86 for operating the obstructing ends 34 of the flow regulator 26. It is also contemplated that a single motor 82 can be operated between various extruding ports 20 for operating a set of rotating shafts 88 and bars 86 for modifying the position of the obstructing end 34 of the respective flow regulators 26. In such an embodiment, the motor 82 can be operable between a plurality of rotating shafts 88 and can selectively and independently operate the various rotating shafts 88 as required for achieving the desired volume and weight tolerances of the extrudable material 12. In such an embodiment, a single motor 82 can be operated between the plurality of rotating shafts 88 that operate the dedicated flow regulators 26. It is also contemplated that multiple motors 82 can be used in connection with a portion of the rotating shafts 88 that operate the respective flow regulators 26 within, above or near the extruding ports 20.

At the output side of the extrusion block 14 where the flow 24 of extrudable material 12 leaves the extruding ports 20, various sensors can be used to measure the weight and/or speed of the flow 24 of extrudable material 12 leaving the extruding port 20. These sensors can be in the form of lasers, ultrasonic sensors, scales, and other similar sensors that can assess the weight and/or density of individual portions of the extrudable material 12. In at least one example, a worker on an assembly line can remove specific samples from each extruding port 20 and place each sample on a scale. The weights of each of the samples can be assessed to determine whether the respective flow regulator 26 for the corresponding extruding port 20 needs to be modified to adjust the volume of the extrudable material 12 moving into the extruding port 20. After measuring the weight of each sample, a motor 82 can automatically adjust the position of the obstructing end 34 of the flow regulator 26 to increase or decrease the volume of the flow 24 of material into the respective extruding port 20 as needed. It is contemplated that automated assemblies for assessing weight of the various samples delivered from the corresponding extruding ports 20 can also be used.

According to the various aspects of the device, the linear or axial operating mechanism for the flow regulators 26 of the regulating mechanism 22 can vary depending upon the specific design of the extrusion block 14, the material being extruded, and other similar considerations. Each of these mechanisms is intended to operate the obstructing end 34 of the flow regulator 26 with respect to the interface 60 between the opposing rollers 30 of the rolling assembly 16. As discussed previously, moving the obstructing end 34 closer to the interface 60 allows for the movement of a lesser volume of the extrudable material 12 into a corresponding extruding port 20. Because less material is moved through the extruding port 20, as the material equalizes within the extruding port 20, the extrudable material 12 naturally expands to equalize. This natural expansion or equalization, where less material is included, results in either a slower extruded flow 66, a less dense extruded flow 66, or both that is moved through the respective extruding port 20. As the extruded flow 66 is cut into sections, each section will, in turn, have a decreased weight. Conversely, where the obstructing end 34 is moved away from the interface 60 between the opposing rollers 30 of the rolling assembly 16, the extrudable material 12 is allowed to more freely move around the flow regulator 26 so that the volume of extrudable material 12 moving toward the interface 60 is substantially similar to that which moves through the extruding port 20. As the extrudable material 12 expands to occupy the space provided by the extruding port 20, the extruded flow 66 moves faster, and the extruded flow 66 is more dense, or both. This faster or more dense form of the extrudable material 12 is moved through the extruding port 20. The resulting cut sections will, in turn, have a greater weight.

In the various aspects of the device, as exemplified in FIGS. 1-15, incremental vertical movements of the obstructing end 34 of the regulating mechanism 22 can result in incremental changes in the volume of the extrudable material 12 moving into the respective extruding port 20. As the flow 24 of extrudable material 12 leaves the lower end 64 of the cup 62 for the extruding port 20, a cutting assembly cuts 68, the extruded flow 66 of material into individual sections. Depending upon the volume of the flow 24 of extrudable material 12 that moves into the extruding port 20 as a result of the operation of the flow regulators 26 for the regulating mechanism 22, the weight of each cut section of the extrudable material 12 is also incrementally varied. These incremental changes are advantageous to provide specific and consistent weights of the extrudable material 12 to be baked into the final form for delivery to a retailer and end consumer. The incremental changes offered by the movement of the obstructing end 34 of each flow regulator 26 minimizes the amount of waste that may be experienced by products that are outside of the desired weight tolerances for that particular product. Additionally, the incremental changes in the individual extruding ports 20 allows for the production of substantially consistent products throughout each of the extruding ports 20 for the extrusion block 14, regardless of the position of the extruding port 20 within the extrusion block 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An extruder assembly comprising:
    a rolling assembly;
    an extrusion block having a plurality of extruding ports that receive an extrudable material from the rolling assembly, and
    a regulating mechanism positioned within each extruding port of the plurality of extruding ports, wherein the regulating mechanism is operable with respect to the rolling assembly to modify a flow of extrudable material through each respective extruding port, wherein the regulating mechanism includes a plurality of flow regulators that are respectively positioned within the plurality of extruding ports, wherein each flow regulator of the plurality of flow regulators is selectively and independently operable within each respective extruding port between a less-volume position proximate the rolling assembly and a more-volume position distal from the rolling assembly.

2. The extruder assembly of claim 1, wherein each regulating mechanism is linearly operated within the respective extruding port.

3. The extruder assembly of claim 1, wherein operation of the regulating mechanism adjusts a volume of the extrudable material that is delivered through the respective extruding port.

4. The extruder assembly of claim 1, wherein each flow regulator is controlled by a dedicated motor.

5. The extruder assembly of claim 1, wherein each flow regulator is manually controlled by a corresponding manual assembly.

6. The extruder assembly of claim 1, wherein the plurality of flow regulators are linearly operable through operation of a camming mechanism.

7. The extruder assembly of claim 6, wherein each flow regulator of the plurality of flow regulators is a planar member that includes a guide portion that engages at least the camming mechanism.

8. The extruder assembly of claim 7, wherein the guide portion extends diametrically across the respective extruding port.

9. The extruder assembly of claim 1, wherein each flow regulator of the plurality of flow regulators is a planar member that includes a guide portion that engages at least a camming mechanism, wherein the guide portion includes a center aperture that receives an eccentric of the camming mechanism, and wherein the guide portion includes a guide slot that slidably engages a rod extending through the respective extruding port.

10. A regulating extruder assembly comprising:
a rolling assembly;
an extruding block having a plurality of extruding ports that receive an extrudable material from the rolling assembly, and
a plurality of flow regulators that are positioned along respective central axes of the plurality of extruding ports, respectively, wherein each flow regulator is selectively operable along a central axis of a respective extruding port and relative to the rolling assembly to modify a flow of the extrudable material through the respective extruding port.

11. The regulating extruder assembly of claim 10, wherein the flow regulators are positioned within each respective extruding port and are axially operable along the respective central axes through operation of a camming mechanism.

12. The regulating extruder assembly of claim 11, wherein the flow regulator is a planar member that includes a guide portion that engages at least the camming mechanism.

13. The regulating extruder assembly of claim 12, wherein the guide portion extends diametrically across the respective extruding port.

14. A regulating extruder assembly comprising:
a rolling assembly;
an extruding block having a plurality of extruding ports that receive an extrudable material from the rolling assembly, and
a plurality of flow regulators that are positioned within the plurality of extruding ports, respectively, wherein each flow regulator is selectively operable along a central axis of a respective extruding port and relative to a nip point of the rolling assembly to modify at least one of a speed and density of the extrudable material exiting the respective extruding port.

15. The regulating extruder assembly of claim 14, wherein the flow regulators are each independently and selectively operable between a less-volume position proximate the rolling assembly and a more-volume position distal from the rolling assembly.

16. The regulating extruder assembly of claim 14, wherein each flow regulator is operated via an adjustment interface that engages the respective flow regulator inside the respective extruding port.

17. The regulating extruder assembly of claim 16, wherein the plurality of flow regulators are each planar members that includes a guide portion that engages at least the adjustment interface.

18. The regulating extruder assembly of claim 17, wherein the guide portion extends diametrically across the respective extruding port.

19. The regulating extruder assembly of claim 16, wherein operation of the adjustment interface linearly operates a respective flow regulator of the plurality of flow regulators.

* * * * *